J. PEARCE
SEED-SOWER.
No. 186,214. Patented Jan. 16, 1877.
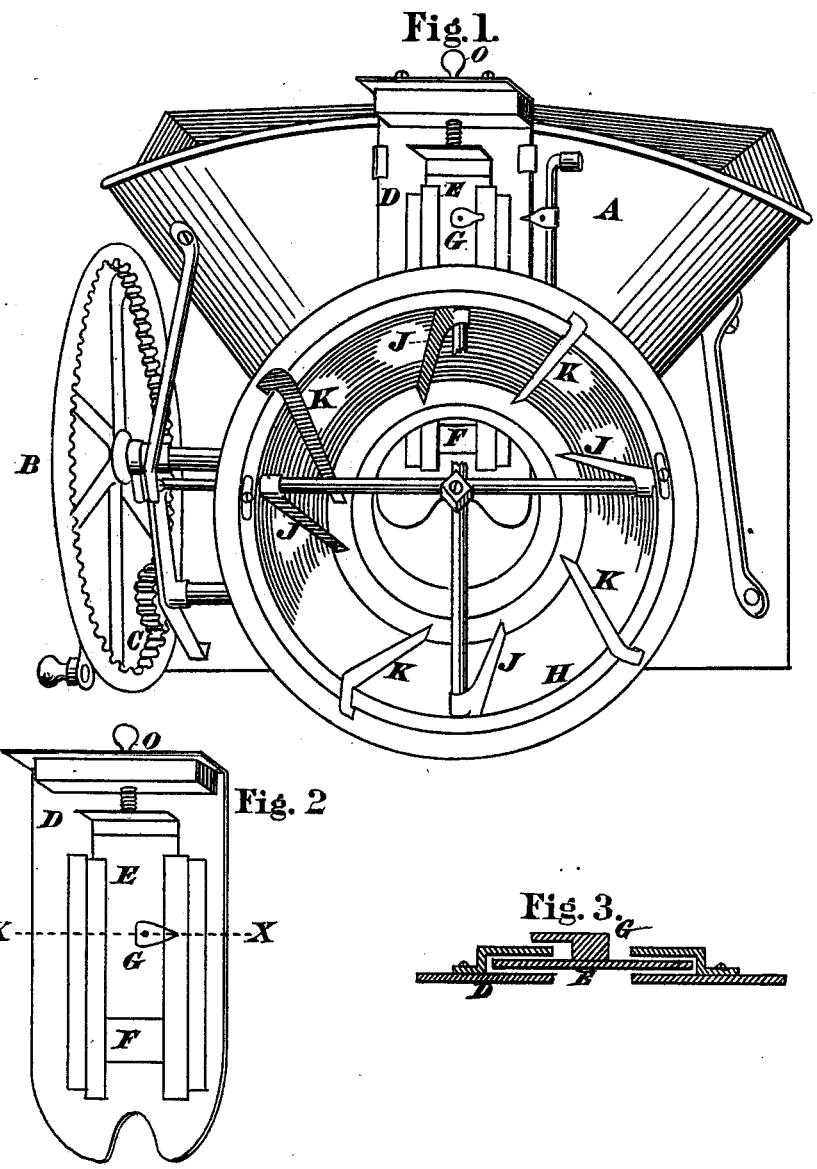

UNITED STATES PATENT OFFICE.

JONATHAN PEARCE, OF SHELBY COUNTY, KENTUCKY.

IMPROVEMENT IN SEED-SOWERS.

Specification forming part of Letters Patent No. 186,214, dated January 16, 1877; application filed October 23, 1876.

*To all whom it may concern:*

Be it known that I, JONATHAN PEARCE, of Shelby county, in the State of Kentucky, have invented a certain new and useful Improvement in Machines for Sowing Seed; and I do hereby declare that the following is a full, clear, and exact description thereof, which will enable others skilled in the art to make and use the same, reference being had to the accompanying drawing, forming part of this specification.

Figure 1 is a perspective view of the machine, showing its general construction. Fig. 2 is a view of the adjustable slide for regulating the quantity of seed to be sown. Fig. 3 is a sectional view of the adjustable slide at line $x\ x$ of Fig. 2.

Similar letters of reference indicate corresponding parts of the drawing.

This my invention relates to a machine for sowing seed; and has for its object an increase in the efficiency, convenience, and durability of a class of devices for sowing all kind of small seeds; consisting in the peculiar arrangement of several devices, constituting a machine by means of which seed may be sown regularly, and evenly distributed over the ground, by means of centrifugal force, produced by rapid motion given to the machine by the operator, which effectually scatters the seed, and thereby saves much time and labor, with better results than is possible to be done by hand.

This machine is more fully illustrated in detail in perspective view, Figs. 1 and 2, and sectional view, Fig. 3, of the drawing, in which it is not deemed necessary to show a part of the driving mechanism under the hopper, as nothing is claimed on that part of the device.

In the annexed drawing, A represents the hopper or body of the machine, which is made of sheet metal, and in form as shown in the drawing, with a small sack secured to the top, to assist in holding the seed, and also to answer as a means by which it may be suspended from the neck of the operator. B is the driving-wheel, by which the machine is operated, and C is the pinion. D is an adjustable slide working on the front of the hopper, for the purpose of regulating the quantity of seed to be sown. This last-named slide D is made in form as shown in the drawing, with a small slot-hole, F, near the lower end, which hole may be made either round, square, or oval, and provided with an additional small slide, E, working over it, in order to close or open the space, to permit the escape of more or less seed, and thereby regulate the quantity required per acre of land. G is an index-hand used in setting the slide at a given point when the quantity of seed is determined. O is a thumb screw or stop for the slide E. H is a bowl-shaped ring or mouth-piece, made of metal, with a narrow flange turned on the inside of the bottom and outside of the top, and is secured to a four-armed center piece on the end of the shaft, by which the machine is driven, so as to work nearly close against the hopper. This bowl-shaped mouth-piece H is provided with stationary ribs J J J J, and adjustable ribs K K K K on the inside, to assist in effectually distributing the seed as it leaves the mouth of the machine, the adjustable ribs K K K K being more especially intended to equalize the distance sown on either side of the operator, and are so arranged as to be easily adjusted, or set at any required angle most suitable for sowing the different kinds of seed, and can be secured in that position by means of set-screws through slot-openings in the flange of the mouth-piece.

These last-named adjustable ribs K K K K may be made as described, or, if necessary, may be hinged on the inside of the mouth-piece near the top, and operated by means of a ring around the bowl or mouth-piece near the bottom, connecting with the ribs by means of set-screws through slot-openings in the mouth-piece, or in any other suitable manner most convenient.

Having thus fully described the nature and object of this my invention, what I claim as new, and desire to secure by Letters Patent, in a machine for sowing seed, is—

The adjustable ribs K K K K in a centrifugal seed-sower, as above described, arranged, constructed, and operated substantially as and for the purpose set forth.

JONATHAN PEARCE.

Witnesses:
C. HEWITT,
FRANK PARDON.